(12) United States Patent
Choi (10) Patent No.: US 8,390,424 B2
(45) Date of Patent: Mar. 5, 2013

(54) METHOD AND APPARATUS FOR PROVIDING STATE INFORMATION OF DIGITAL DEVICE IN HOME NETWORK

(75) Inventor: Jin-seok Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1195 days.

(21) Appl. No.: 11/657,052

(22) Filed: Jan. 24, 2007

(65) Prior Publication Data

US 2007/0205858 A1 Sep. 6, 2007

(30) Foreign Application Priority Data

Feb. 17, 2006 (KR) .................. 10-2006-0015709

(51) Int. Cl.
*G05B 23/02* (2006.01)
(52) U.S. Cl. ...................... 340/3.1; 340/539.1
(58) Field of Classification Search .............. 340/3.1, 340/825, 1.1
See application file for complete search history.

(56) References Cited

U.S. PATENT DOCUMENTS

| | | | | |
|---|---|---|---|---|
| 7,293,236 | B2 * | 11/2007 | Choi et al. | 715/734 |
| 2002/0163534 | A1 * | 11/2002 | Choi et al. | 345/734 |
| 2005/0135341 | A1 * | 6/2005 | Kim | 370/352 |

FOREIGN PATENT DOCUMENTS

| | | |
|---|---|---|
| CN | 1481119 A | 3/2004 |
| CN | 1656750 A | 8/2005 |
| JP | 2002-215483 A | 8/2002 |
| JP | 2003-111170 A | 4/2003 |
| KR | 10-2000-0072398 A | 12/2000 |
| KR | 10-2002-0015856 A | 3/2002 |
| KR | 10-2002-0079203 A | 10/2002 |
| KR | 10-2002-0093516 A | 12/2002 |
| KR | 10-2004-0006226 A | 1/2004 |
| KR | 10-2004-0037670 A | 5/2004 |
| KR | 10-2005-0015817 A | 2/2005 |
| KR | 10-2005-0026646 A | 3/2005 |
| KR | 10-2005-0034412 A | 4/2005 |
| KR | 10-2006-0015056 A | 2/2006 |
| WO | 03/098884 A1 | 11/2003 |

OTHER PUBLICATIONS

"GENA", Wikipedia. Retrieved Aug. 9, 2010. <http://en.wikipedia.org/wiki/GENA>.*
"List of TCP and UDP port numbers", Wikipedia. Retrieved Aug. 9, 2010. <http://en.wikipedia.org/wiki/Port_numbers>.*
Communication from the State Intellectual Property Office of P.R. China dated May 10, 2011 in a counterpart Chinese application No. 200710079192.X.

* cited by examiner

*Primary Examiner* — Brian Zimmerman
*Assistant Examiner* — Sara Samson
(74) *Attorney, Agent, or Firm* — Sughrue Mion, PLLC

(57) ABSTRACT

Provided are a method and apparatus for providing state information of a digital device in a home network. The apparatus includes a first network interface module receiving changed state information data from the digital device in the home network, and a control module updating state information of the digital device on the basis of the received state information data.

20 Claims, 7 Drawing Sheets

```
                                                        10
                                                        )
    <?XML version="1.0"?>
12 — <deviceInfo  xmlns="http://CEStandard.org/deviceInfo.xsd" date="05-26-03"
                                                        version="VX1.0">
13 — <manufacturer  name="Samsung" URI=www.samsung.com/deviceinfo"
                                    serialno="ABC-12358"
                                    manufactureDate="05-30-03"
                                    modelRangeName="Super High"/>
14 — <functionType   name="STB-NIU"
                     subname="TUNER-DISH"
                     modelName="HWW" />
15 — <1394StreamSource    coding="MPEG2"    rate-kbps="19200"/>
16 — <userInterface="none"/>
17 — <eventNotificationUI="none"/>
18 — <HTTPCommandInterfaceRef    name="XHT931"
                                 URI=".schemas/XHT931.xsd"/>
    </deviceInfo>
```

FIG. 4

```
                                                        20
                                                        )
    <?XML version="2.0"?>
22 — <OperationList   xmlns="http://CEStandard.org/XHT931.xsd"   date="05-26-03"
                                                        version="VX2.0">
23 — <Op code="EVENT-NOTIFICATION"/>
24 — <Op code="POWER"/>
25 — <Op code="PLAY"/>
26 — <Op code="STOP"/>
27 — <Op code="PAUSE"/>
28 — <Op code="REWIND"/>
    </OperationList>
```

METHOD AND APPARATUS FOR PROVIDING STATE INFORMATION OF DIGITAL DEVICE IN HOME NETWORK

CROSS REFERENCE TO RELATED APPLICATION

This application claims priority from Korean Patent Application No. 10-2006-0015709 filed on Feb. 17, 2006, in the Korean Intellectual Property Office, the disclosure of which is incorporated herein by reference in its entirety.

BACKGROUND OF THE INVENTION

1. Field of the Invention

Apparatuses and methods consistent with the present invention relate to a home network system, and more particularly, to efficiently and stably providing state information on digital devices in a web-based home network system in real-time.

2. Description of the Related Art

Recently, as technologies for processing digital audio/video (A/V) are being rapidly developed, various digital devices such as digital televisions (TVs), set-top boxes, digital versatile disc (DVD) players, digital amplifiers or the like, have been installed and used in homes and offices. In addition, users in the homes or offices can conveniently control the various devices using a remote controller or the like. However, as the number of the digital devices installed in a limited space increases, devices are becoming more complicated, and controlling these devices has become more difficult.

Accordingly, technologies have been researched in which a plurality of digital devices are interconnected with one another to form one system, such that users can easily control the digital devices. According to these technologies, the digital devices can be connected to other digital devices through network interfaces to form one home network system.

As a result of the research, a technology standard, eXpandable Home Theater (XHT), has been developed and suggested to serve as middleware for digital home networking. The XHT technology as a digital TV based home network solution developed by Samsung Electronic Co., Ltd. has adopted as the standard of Consumer Electronics Association (CEA) in the United States of America.

According to the XHT technology, by using an IEEE 1394 cable capable of continuously transmitting a plurality of high definition (HD) signals, and the Internet Protocol (IP), not only can digital devices connected to a digital TV be controlled, but also a plurality of digital TVs can be controlled. By using the XHT technology, users can view digital broadcasting through a TV disposed in an inner room by using a digital broadcasting receiving function of the digital TV.

Since an inexpensive network interface unit (NIU) using the XHT technology is constructed in a type of a memory card, it can be easily changed according to different reception methods, such as territorial, satellite, and cable. Such versatility allows broadcasting providers to reduce costs. In particular, according to the XHT technology, various portal services can be provided through browsers installed in a digital TV.

In a home network system according to the XHT technology, a plurality of controlled devices, such as a DVD player, a digital hard disk drive, a set-top box, an amplifier, or the like, are controlled by a control device such as a digital TV, and each of them provides a user interface (UI). The control device displays the UIs provided by the controlled devices so as to allow a user to control the controlled devices.

Further, the control device periodically checks the state of the controlled device, and when the state of the controlled device is changed, the control device updates the user interface for the corresponding controlled device. In order to perform this function, the control device transmits a request signal requesting the state information of the controlled device to the controlled device. After the controlled device receives the request signal transmitted by the control device, when the state of the controlled device is changed, the controlled device transmits the state information of the controlled device to the control device. Even if the state of the controlled device is not changed, the controlled device transmits the same state information as the state information having been transmitted to the control device after a predetermined time passes, in order to maintain the connection state between the controlled device and the control device.

As a result, the control device receives the state information from the controlled device, and updates a web page of the corresponding controlled device or repeats a process of requesting the state information of the controlled device.

However, according to the related art, even though the state of the controlled device is not changed, the controlled device should transmit the same state information as the state information having transmitted to the control device in order to maintain the connection state between the control device and the controlled device, which results in increasing a load of the network.

In order to solve the above-described problems, various technologies (for example, refers to Korean Laid-Open Publication No. 2002-015856) have been suggested, but the above-described problems are not resolved.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for efficiently and stably providing state information of digital devices in a Web based home network system in real-time.

According to an aspect of the invention, there is provided an apparatus for providing state information of a digital device in a home network, the apparatus including a first network interface module receiving changed state information data from the digital device in the home network, and a control module updating state information of the digital device on the basis of the received state information data.

According to another aspect of the invention, there is provided a method of providing state information of a digital device in a home network, the method including receiving changed state information data from the digital device in the home network, and updating state information of the digital device on the basis of the received state information data.

BRIEF DESCRIPTION OF THE DRAWINGS

The above and other aspects of the invention will become more apparent by describing in detail exemplary embodiments thereof with reference to the attached drawings, in which.

DESCRIPTION OF THE EXEMPLARY
EMBODIMENTS OF THE INVENTION

Aspects of the invention and methods of accomplishing the same may be understood more readily by reference to the following detailed description of exemplary embodiments and the accompanying drawings. The invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the invention should be defined by the appended claims. Like reference numerals refer to like elements throughout the specification.

The exemplary embodiments of the invention will now be described more fully with reference to the accompanying drawings, in which exemplary embodiments of the present invention are shown. Blocks in the accompanying block diagrams and compositions of operations in flow charts can be performed by computer program instructions. Such computer program instructions can be provided to processors of, for example, general-purpose computers, special-purpose computers, and programmable data processing apparatuses. Therefore, the instructions performed by the computer or the processors of the programmable data processing apparatus generating means for executing functions described in the blocks in block diagrams or the steps in the flow charts. The computer program instructions can be stored in a computer available memory or a computer readable memory of the computer or the programmable data processing apparatus in order to realize the functions in a specific manner. Therefore, the instructions stored in the computer available memory or the computer readable memory can manufacture products including the instruction means for performing the functions described in the blocks in the block diagrams or the steps in the flow charts. Also, the computer program instructions can be loaded onto the computer or the computer programmable data processing apparatus. Therefore, a series of operational steps is performed in the computer or the programmable data processing apparatus to generate a process executed by the computer, which makes it possible for the instructions driving the computer or the programmable data processing apparatus to provide steps of executing the functions described in the blocks of the block diagrams or the steps of the flow charts.

Each block or each step may indicate a portion of a module, a segment or a code including one or more executable instructions for performing a specific logical function (or functions). It should be noted that, in some modifications of the invention, the functions described in the blocks or the steps may be generated out of order. For example, two blocks or steps continuously shown can be actually performed at the same time, or they can be performed sometimes in reverse order according to the corresponding functions.

Figure 1:
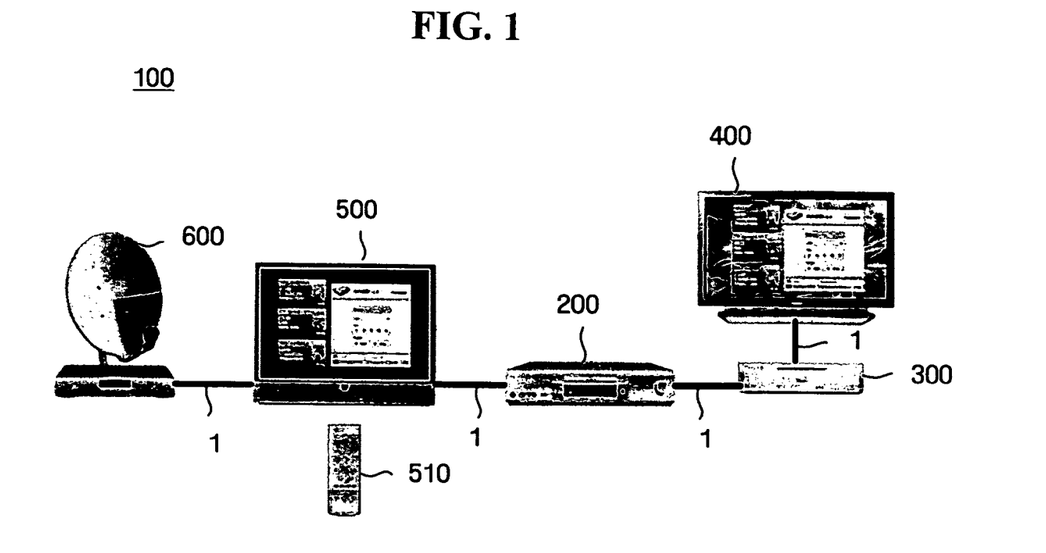
FIG. 1 is a diagram illustrating a structure of a home network system according to an exemplary embodiment of the invention.

FIG. 1 is a diagram illustrating a structure of a home network system according to an exemplary embodiment of the invention.

The home network system shown in FIG. 1 may include a plurality of digital devices 200, 300, 400, 500, and 600. At this time, the plurality of digital devices 200, 300, 400, 500, and 600 form a network by a digital interface 1 according to the IEEE 1394 standard, and an Extensible Markup Language (XML) is used as middleware for home networking in the plurality of digital devices 200, 300, 400, 500, and 600. A local Internet Protocol (IP) address is automatically allocated to each of the digital devices 200, 300, 400, 500, and 600 in the network by a predetermined address allocating algorithm.

The digital devices 200, 300, 400, 500, and 600 in the home network system are largely classified into controlled devices 200, 300, 400, and 600, and a control device 500. The controlled devices 200, 300, 400, and 600 serve as a UI data server in a home network. That is, the controlled devices 200, 300, 400, and 600 transmit their UI information to the control device 500. Specifically, the controlled devices 200, 300, 400, and 600 to which local IP addresses are allocated represent their device information as an XML file (DeviceInfo.xml) according to a predetermined defined syntax form (defined by a file DeviceInfor.xsd), and transmit them to the control device 500. In the DeviceInfo.xml file created by the controlled devices 200, 300, 400, and 600, a Uniform Resource Identifier (URI) of a file (XHT931.xsd) is written that describes a set of Hypertext Transfer Protocol (HTTP) commands for operating the controlled devices.

Each of the controlled devices 200, 300, 400, and 600 that create the file DeviceInfo.xml creates the XML file (XHT931.xml) where HTTP commands applied by each device are written while referring to the file XHT931.xsd, and transmits it to the control device 500.

Further, the controlled devices 200, 300, 400, and 600 check their states, and provide changed device information to the control device 500. Examples of the controlled devices 200, 300, 400, and 600 may include a network interface unit 600 that receives cable, satellite, or terrestrial broadcasting signals, such as a set-top box, an A/V data storage device 200, and an A/V data reproducing device 300. The controlled devices will be described in detail below with reference to FIG. 2.

The control device 500 serves as a client that has a browser built in a home network. That is, in a case in which the control device 500 receives the DeviceInfo.xml file having represented the device information and the XHT931.xml file having written the HTTP commands applied by the controlled device 200, which are transmitted by the controlled device 200, the control device 500 displays the device information of the controlled device 200 and control menu information as a type of a graphic user interface by using the files received from the controlled device 200, and controls the specific controlled device 200 by using the HTTP commands. This control device 500 may be exemplified by the digital TV 500, and the specific description of the control device 500 will be described in detail below with reference to FIG. 5.

Figure 2:
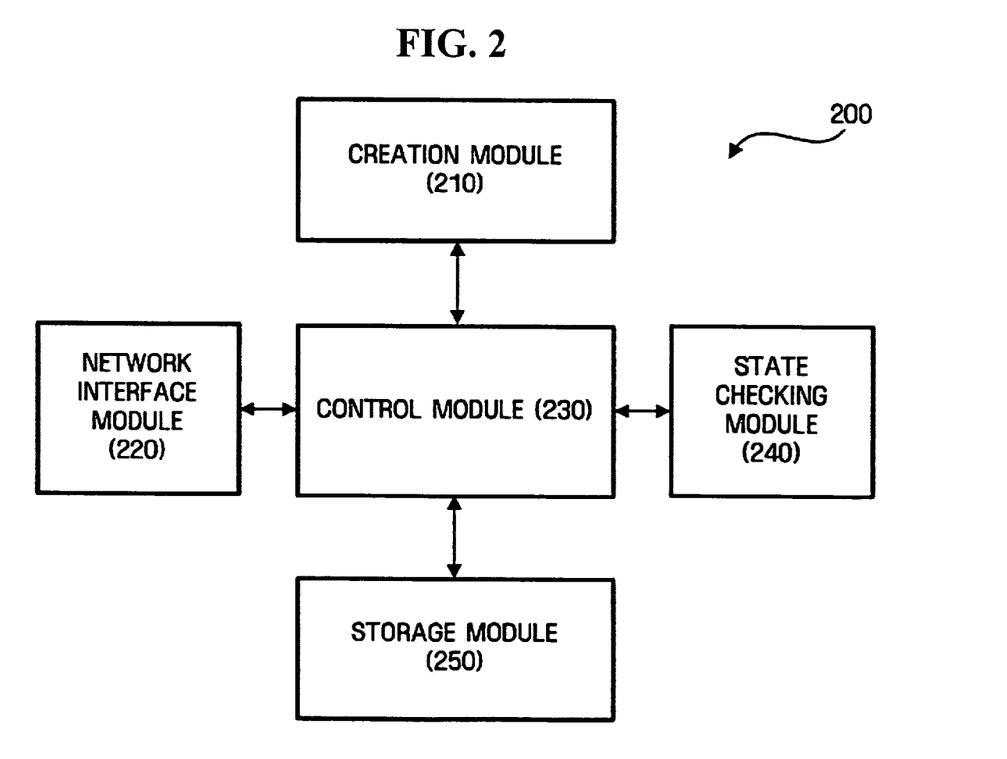
FIG. 2 is a block diagram illustrating a structure of a controlled device according to an exemplary embodiment of the invention.

FIG. 2 is a block diagram illustrating a structure of the controlled device 200 according to an embodiment of the invention. The controlled device 200 shown in FIG. 2 includes a creation module 210, a network interface module 220, a storage module 250, a state checking module 240, and a control module 230.

The creation module 210 creates a DeviceInfo.xml file that includes the device information of the controlled device 200, and a XHT931.xml file in which HTTP commands applied by the controlled device 200 are written.

Here, the DeviceInfo.xml file and the XHT931.xml file will be described with reference to FIGS. 3 and 4.

Figure 3:
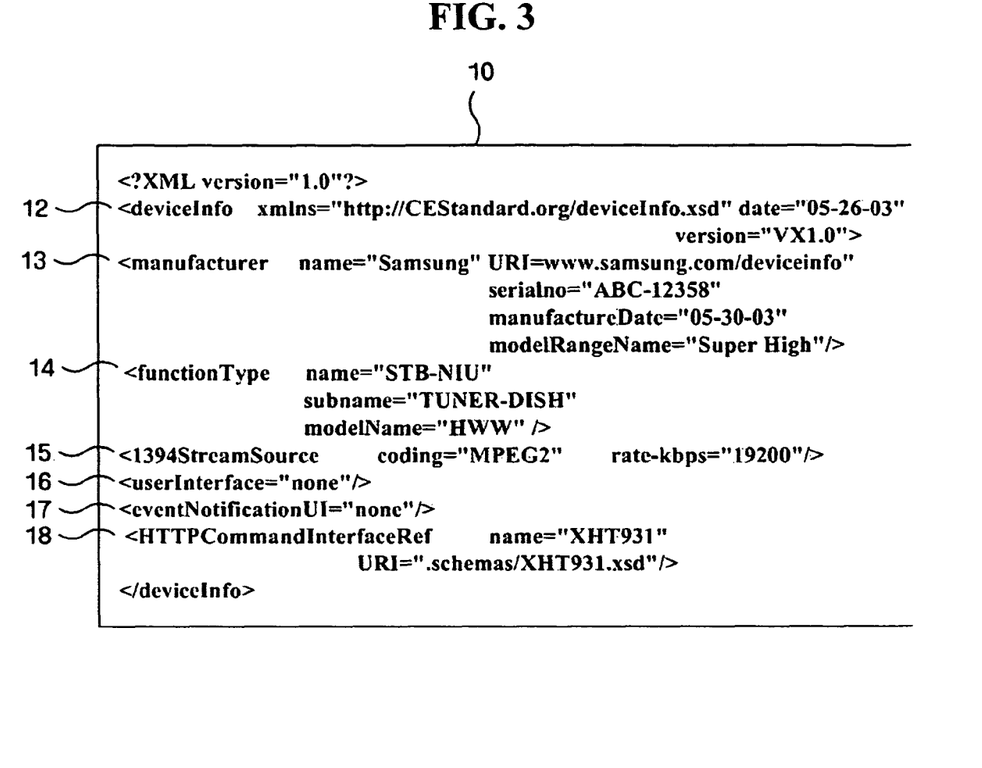
FIG. 3 is a diagram illustrating an example of contents of a DeviceInfo.xml file created by a controlled device according to an exemplary embodiment of the invention.

FIG. 3 is a diagram illustrating an example 10 of contents of the DeviceInfo.xml file that is created by the controlled device 200 according to the syntax of the DeviceInfo.xsd.

Location information, a date, and a version of the device-Info.xsd file are described in a deviceInfo tag location 12, and a manufacturer, a URI, and a manufactured date of the controlled device 200 are described in a manufacturer tag location 13. In addition, a functional name, a subname, and a model name of a product are described in a functionType tag location 14, and a coding method and a bit rate of a stream are described in a 1394StreamSource tag location 15.

Information related to a user interface is described in a userInterface tag location 16, and information related to a user interface informing event occurrence is described in an eventNotificationUI tag location 17. In the example shown in FIG. 3, a user interface function is not applied. In addition, a name of the XHT standard applying the HTTP commands, and a URI of a file (XHT931.xsd) defining the HTTP commands are written in a HTTPCommandInterfaceRef tag location 18.

Figure 4:
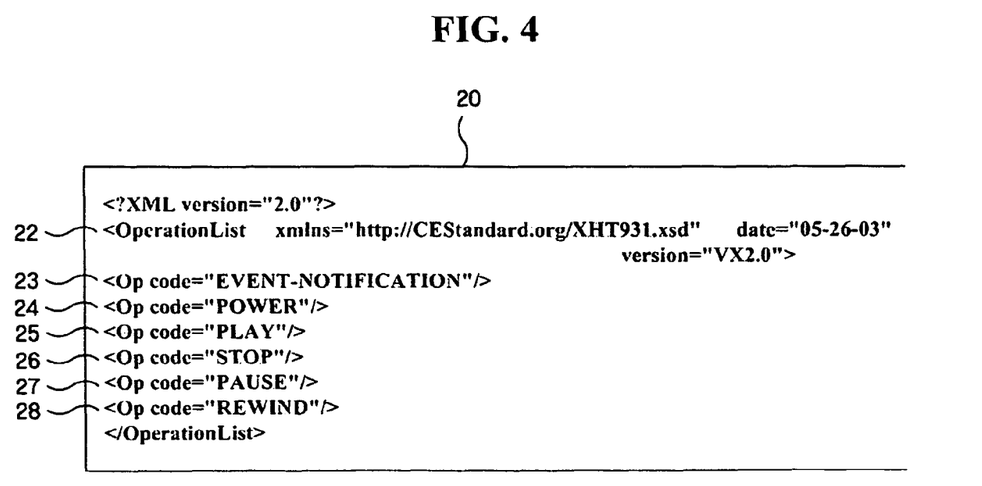
FIG. 4 is a diagram illustrating an example of contents of an XHT931.xml file created by a controlled device according to an exemplary embodiment of the invention.

FIG. 4 is a diagram illustrating an example 20 of contents of the XHT931.xml file that is created by the controlled device 200 according to the syntax of the XHT931.xsd.

First, a URI, a date, and a version of the referenced XHT931.xsd file are described in an OperationList tag location 22, and then, operation codes applied by the controlled device 200 are written. The controlled device 200 according to the embodiment shown in FIG. 4 applies a function of informing other digital devices of state change of the device when the state change of the device is generated (EVENT-NOTIFICATION; 23), a function of turning on or off a power supply (POWER; 24), a function of reproducing designated contents (PLAY; 25), a function of stopping reproducing of contents that are being reproduced (STOP; 26), a function of temporarily stopping the contents that are being reproduced (PAUSE; 27), and a function of rewinding the contents (RE-WIND; 28).

Referring to FIG. 2 again, the network interface module 220 transmits and receives contents transmitted through the network as shown in FIG. 1, for example, data, such as images, still images, files of media, various control commands, and the like.

The storage module 250 stores data necessary for constructing the UI of the controlled device 200, for example, an icon indicating the controlled device 200, control menu information, and device information. Also, the storage module 250 may store the XML file created by the creation module 210 and digital contents, for example, a MPEG2 Transport Stream (TS) for broadcasting programs. The storage module 250 may be implemented by at least one of storage media, such as a non-volatile memory element like a cache, a Read Only Memory (ROM), a Programmable ROM (PROM), an Erasable Programmable ROM (EPROM), an Electrically Erasable Programmable ROM (EEPROM), a flash memory, or the like; a volatile memory element like a Random Access Memory (RAM), or the like; and a Hard Disk Drive (HDD). The invention is not limited thereto.

The state checking module 240 periodically checks the operation state of the controlled device 200. As a result of checking of the operation state by the controlled device 200, when the operation state of the controlled device 200 is changed, the state checking module 240 creates state information data including the changed state information of the controlled device 200, and provides it to the control device 500. For example, when recording is completed in a state in which predetermined digital contents are recorded in the storage module 250, the state checking module 240 provides state information indicating the completion of the recording to the control device 500. As another example, when a remaining storage space of the storage module 250 is not more than a predetermined threshold value in a state in which the digital contents are being recorded in the storage module 250, the state checking module 240 provides state information indicating that a space necessary for recording is not sufficient to the control device 500.

The control module 230 may perform an operation according to an instruction transmitted by the network interface module 220. For example, when the control module 230 receives an instruction indicating that the control module 230 transmits the MPEG-2 transport stream (TS) stored in the storage module 250 through the network interface module 220 to the control device 500, the control module 230 transmits the MPEG-2 TS to the control device 500.

Meanwhile, application software for processing the received instructions is mounted in the control module 230. In addition, an MPEG TS decoder, an IEEE 1394 stack, a network layer, a web server, and the like are mounted in the control module 230, and the control module 230 provides a function of allowing the controlled device 200 to operate as a networked device.

Figure 5:
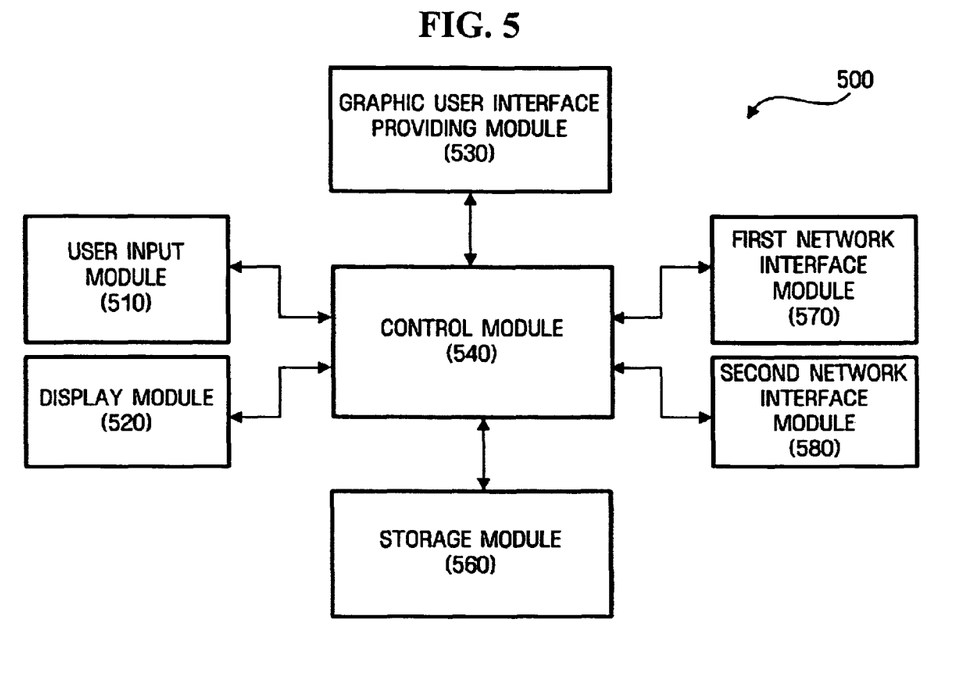
FIG. 5 is a block diagram illustrating a structure of a controlled device according to an exemplary embodiment of the invention.

FIG. 5 is a block diagram illustrating a structure of the control device 500 according to the embodiment of the invention. The control device 500 shown in FIG. 5 includes a first network interface module 570, a second network interface module 580, a storage module 560, a graphic user interface providing module 530, a user input module 510, a display module 520, and a control module 540.

The first network interface module 570 serves as a network port for performing communication with the controlled device 200, and receives the UI information from the controlled device 200. When the first network interface module 570 receives a control instruction for the specific controlled device 200 through the user input module 510 to be described later, it transmits the received control instruction to the corresponding controlled device 200. In this case, the port refers to a logical connection location. In particular, at the time of using TCP/IP, a client program designates a specific server program on a network. Application programs that use upper protocols like HTTP to be the web protocols have port numbers that are designated in advance by Internet Assigned Numbers Authority (IANA). New port numbers are assigned to other application program processes whenever connected. When a server program starts, it is bound to a designated port number. All of client programs that want to use the server program should be bounded to the designated port numbers. The port numbers are 0 to 65536, and the portion numbers of 0 to 1024 are reserved for use in services having exclusive rights. For example, a port having a number 80 is designated for an HTTP service.

The second network interface module 580 is a network port for performing communication with the controlled device 200, and receives state information data including state information of the controlled device 200. As a port number of the second network interface module 580, a port number other than the port number assigned to the first network interface module 570 is designated. For example, a port number 10000 may be designated as a port number of the second network interface module 580.

The storage module 560 stores UI information of the controlled device 200 that is received through the first network interface module 570, for example, information related to a device name, an icon, and an operable function. Further, the storage module 560 may store changed state information of the controlled device 200 that is received through the second network interface module 580. This storage module 560 may be implemented by at least one of storage media, such as a non-volatile memory element like a cache, a ROM, a PROM, an EEPROM, an EEPROM, and a flash memory; a volatile memory element like a RAM; and a HDD. However, the present invention is not limited thereto.

Figure 6:
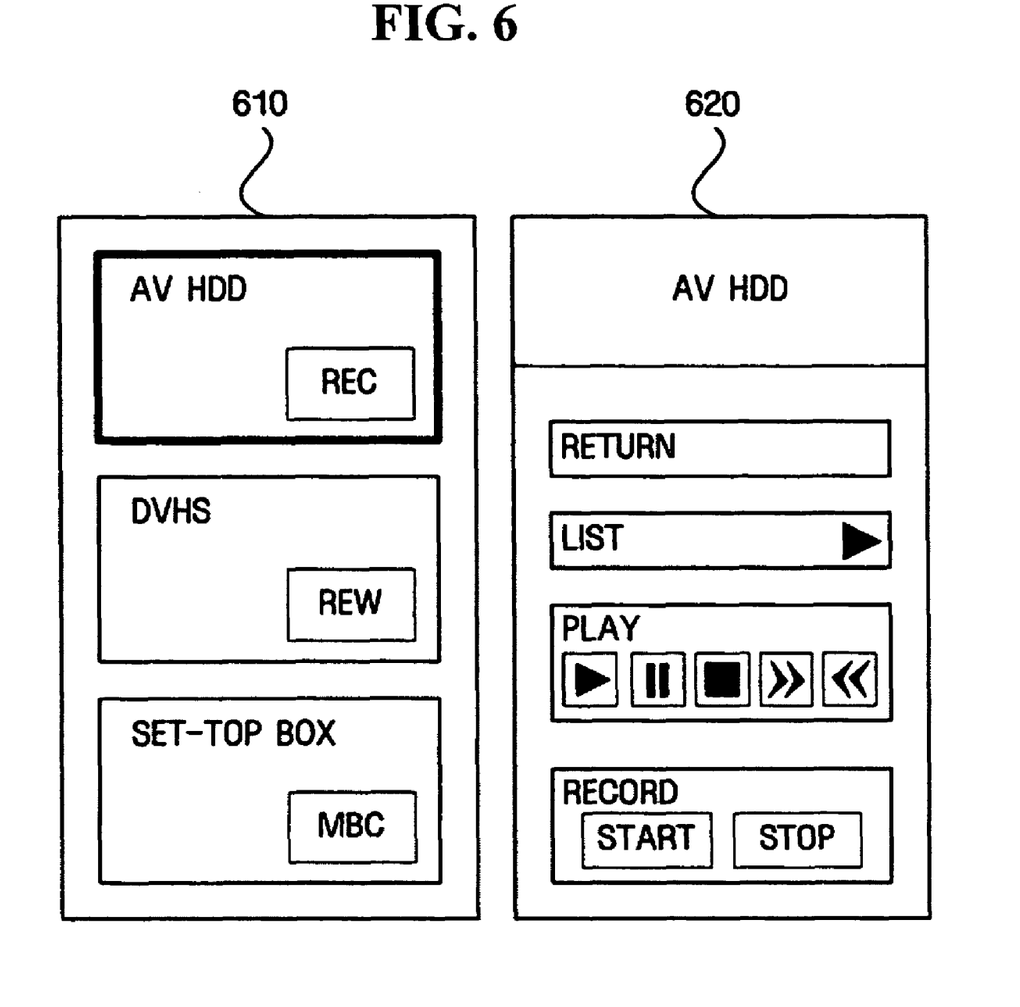
FIG. 6 is a diagram illustrating an example of a graphic user interface provided by a control device according to an exemplary embodiment of the invention.

The graphic user interface providing module 530 provides a graphic user interface that includes device information about the controlled device 200 connected through the network. As shown in FIG. 6, the graphic user interface may include a state frame 610 that contains device information about the controlled device 200 to be controlled, and a control frame 620 that includes functional menus corresponding to the controlled device 200 selected from the state frame 610. The device information of the controlled device 200 may be displayed in an icon type in the state frame 610. At this time, the state information of the controlled device 200 may be transmitted through the icon corresponding to the controlled device 200. For example, in a case in which the controlled device 200 is an A/V data storage device and predetermined digital contents are being recorded through the A/V data storage device, a mark indicating that the A/V data storage device is performing recording, for example, characters "REC" may be displayed on the icon that corresponds to the A/V data storage device.

Further, when the changed state information is received from the controlled device 200, the graphic user interface providing module 530 updates the state information of the corresponding controlled device 200 according to the received state information. For example, the state information indicating that the recording is completed is received from the A/V data storage device, the graphic user interface providing module 530 displays characters "RECORDING STOP" instead of the characters "REC" on the icon that corresponds to the A/V data storage device.

CEA 2027 may be used as a standard of the above-described graphic user interface. The detailed contents of the CEA 2027 can be understood by referring to CEA 2027 version F (A User Interface for Home Networks Using Web-based Protocols__040616).

The display module 520 visually displays the instruction processing result. For example, the display module 520 displays graphic user interfaces 610 and 620, as shown in FIG. 6. The display module 520 may be implemented by image displaying units, such as a liquid crystal display (LCD), a light-emitting diode (LED), an organic light-emitting diode (OLED) or a plasma display panel (PDP), but the invention is not limited thereto.

The user input module 510 receives an instruction that controls the controlled device 200. The control instruction that is received by the user input module 510 is provided to a control module 540, which will be described in detail below.

The user input module 510 may include a remote control signal receiving module such that it may receive an instruction of a remote controller (refers to reference numeral 510 in FIG. 1) for performing remote control of the control device 500.

The control module 540 performs an operation according to the control instruction provided by the user input module 510. For example, when an instruction that makes list information of the controlled devices 200, 300, 400, and 600 display is received, the control module 540 controls the graphic user interface providing module 530, such that the graphic user interfaces 610 and 620 may be constructed, as shown in FIG. 6.

As another example, when a predetermined controlled device 200 is selected from the graphic user interface shown in FIG. 6, the control module 540 creates an HTTP command in which an URI and an operation code of the selected controlled device 200 are bound on the basis of an XML file stored in the storage module 560. For example, in a case in which an IP address assigned to the controlled device 200 is 192.168.0.2 and a program stored in the controlled device 200 is instructed to be viewed, the control device 500 creates an HTTP command, that is, "http://192.168.0.2/CEA931?play&press". When the XML file about the selected controlled device 200 does not exist in the storage module 560, the control module 540 may request the corresponding controlled device 200 to transmit the XML file.

Further, the control module 540 determines whether the state information of the controlled device 200 is received through the second network interface module 570. As a result of determination, when the state information of the controlled device 200 is received, the control module 540 updates the state information of the corresponding controlled device 200 according to the contents of the received state information. Then, the control module 540 provides the updated state information to the graphic user interface providing module 530.

Meanwhile, the term "module" used in FIGS. 2 and 5 means software, or a hardware component such as an FPGA (Field Programmable Gate Array) or an ASIC (Application Specific Integrated Circuit) and the modules each perform allocated functions. However, the modules are not limited to software or hardware. The modules may be configured in an addressable storage medium, or may be configured to run on at least one processor. Therefore, as an example, the modules include: components such as software components, object-oriented software components, class components, and task components; processors, functions, attributes, procedures, sub-routines, segments of program codes, drivers, firmware, microcodes, circuits, data, databases, data structures, tables, arrays, and variables. The functions provided by the components and the modules may be combined into fewer components and or modules may be separated into additional components and modules. In addition, the components and the modules may be configured to execute at least one CPU in a device.

Figure 7:
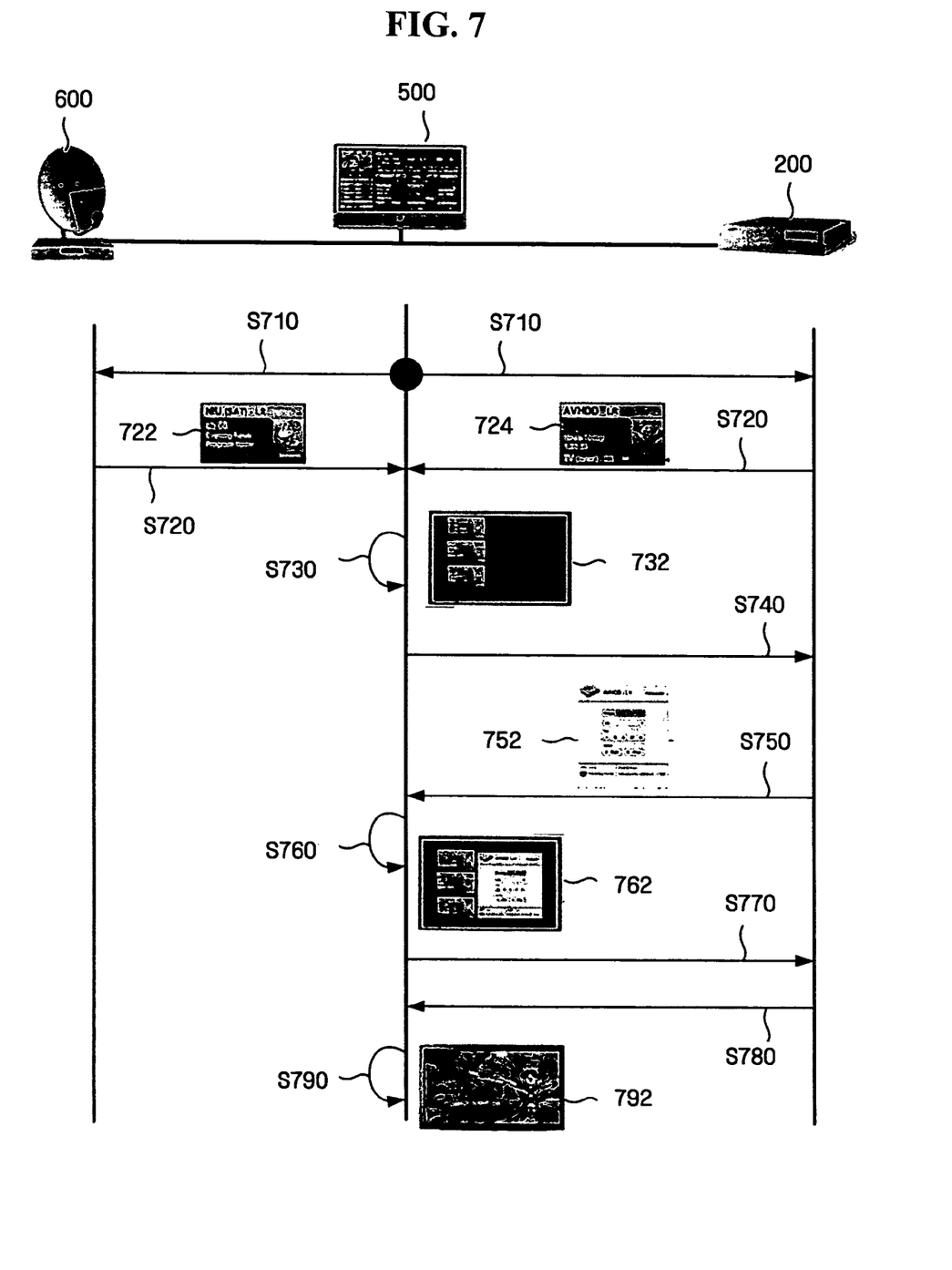
FIG. 7 is a flowchart illustrating an operation process of a home network system according to an exemplary embodiment of the invention.

FIG. 7 is a flowchart illustrating an operation process of a home network system according to an embodiment of the invention.

First, according to the request of the user, the control device 500 requests the controlled device 200, for example, a network interface unit and an A/V data storage device to transmit icons indicating the respective devices (operation S710).

According to the request by the control device 500, the network interface unit and the A/V data storage device transmit the corresponding icons 722 and 724 to the control device 500 (operation S720).

Then, the control device 500 displays the icons transmitted by the network interface unit and the A/V data storage device through web browsers (operations S730 and S732).

At this time, when the user selects the icon indicating the A/V data storage device from the icons displayed through the web browsers, the control device 500 requests the A/V data storage device to transmit a user interface of a structured text form like a Hypertext Markup Language (HTML), and an XML (operation S740). At this time, a web command transmission system according to the related art may be used.

The A/V data storage device transmits the corresponding user interface 752 to the control device 500 (operation S750), and the control device 500 displays the transmitted user interface 752 through the web browsers (operations S760 and S762).

In a case in which the user selects a specific medium file from the displayed user interface 552 and performs the reproducing operation, the control device 500 requests the A/V data storage device to transmit the selected medium file (operation S770).

The A/V data storage device transmits the medium file requested by the control device 500 to the control device 500 (operation S780), and the control device 500 processes the transmitted medium file so as to reproduce the audio and video signals on the screen (operations S790 and S792).

As described above, according to the request by the control device 500, a data exchange between the control device 500 and the controlled device 200 is performed through the first network interface module 570.

Figure 8:
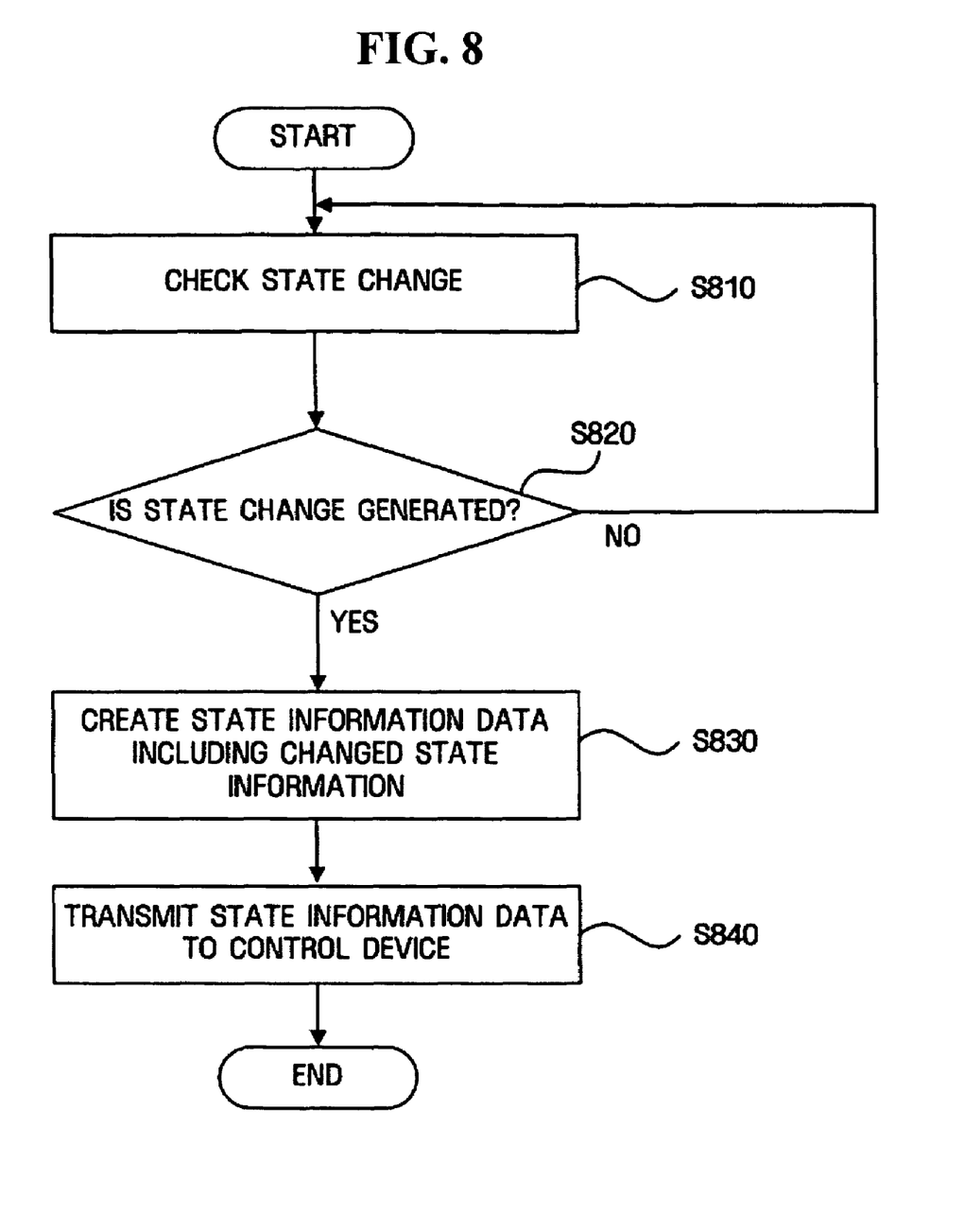
FIG. 8 is a flowchart illustrating an operation process of a controlled device according to an exemplary embodiment of the invention.
Figure 9:
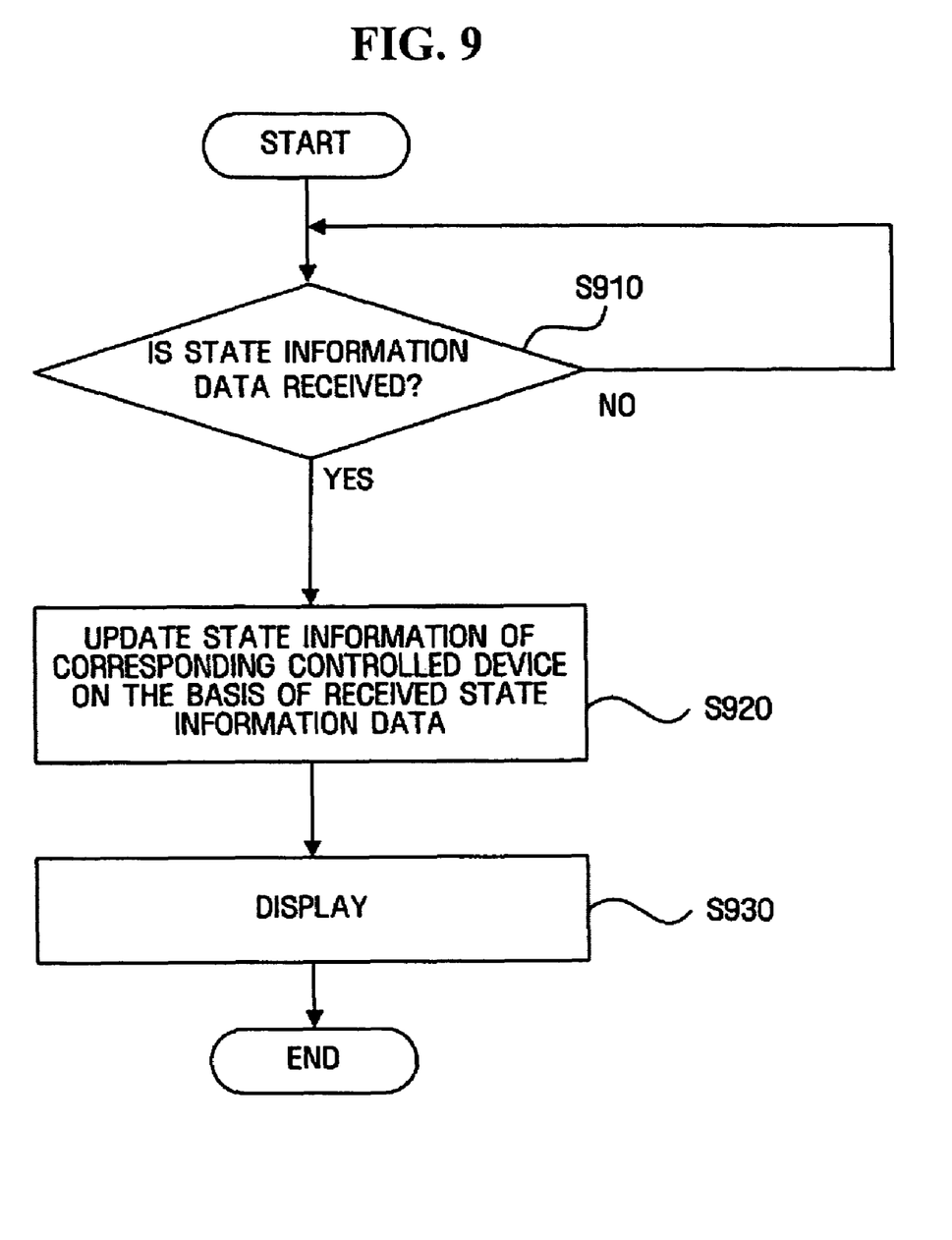
FIG. 9 is a flowchart illustrating an operation process of a control device according to an exemplary embodiment of the invention.

As described above, in a process of receiving the UI information from the controlled device 200 and displaying the UI information through the web browser, when the state of the controlled device 200 is changed, the control device 500 updates the state information of the controlled device 200, which is illustrated in detail in FIGS. 8 and 9.

FIG. 8 is a flowchart illustrating an operation process of the controlled device 200 according to an embodiment of the invention.

The state checking module 240 of the controlled device 200 checks the state of the controlled device 200 (operation S810). Then, the state checking module 240 determines whether the state of the controlled device 200 is changed (operation S820).

As a result of determination, when the state of the controlled device 200 is not changed (operation S820: NO), the state checking module 240 continuously checks the state of the controlled device 200 (operation S810).

As a result of determination, when the state of the controlled device 200 is changed (operation S820: YES), the state checking module 240 creates state information data including the changed state information of the controlled device 200 (operation S830). For example, while predetermined digital contents are being recorded in the controlled device 200, when the recording is completed in the controlled device 200, the state checking module 240 creates state information data including the state information about the recording completion. At this time, identification information of the controlled device 200, for example, an IP address is included in the state information data.

The state information data that is created by the state checking module 240 is transmitted to the control device 500 through the network interface module 220 (operation S840).

FIG. 9 is a flowchart illustrating an operation process of the control device 500 according to an embodiment of the invention.

The control module 540 of the control device 500 determines whether the state information data is received from the controlled device 200 through the second network interface module 580 (operation S910).

As a result of determination, when the state information data is not received from the controlled device 200 through the second network interface module 580 (operation S910: NO), the control module 540 waits until the state information data is received from the controlled device 200.

As a result of determination, when the state information data is received from the controlled device 200 through the second network interface module 580 (operation S910: YES); the control module 540 processes the received state information data, and updates of the state information of the state information data transmitted by the controlled device 200 (operation S920). For example, when receiving from the A/V data storage device the state information data including the state information indicating that the recording is completed, the control module 540 updates the state information of the A/V data storage device to a "recorded state" from a "recording" state. Then, the control module 540 provides the updated state information to the graphic user interface providing module 530.

According to the information provided by the control module 540, the graphic user interface providing module 530 allows characters indicating a recorded state, for example, "RECORDING STOP", instead of the characters indicating a recording state, that is, "REC", to be displayed on the icon that corresponds to the A/V data storage device.

The result processed by the control module 540 and the graphic user interface providing module 530 is displayed through the display module 520 (operation S930).

Although the invention has been described in connection with the exemplary embodiments of the invention, it will be apparent to those skilled in the art that various modifications and changes may be made thereto without departing from the scope and spirit of the invention. Therefore, it should be understood that the above exemplary embodiments are not limitative, but illustrative in all aspects.

According to the method of providing information of a digital device, and the apparatus thereof, the following effects can be achieved.

According to one aspect of the invention, it is possible to update the state information of the digital device in real time.

According to another aspect of the invention, it is possible to stably update the state information of the digital device.

What is claimed is:

1. An apparatus for providing state information of a digital device in a home network, the apparatus comprising:
   a first network interface module which receives changed state information from the digital device in the home network, and which is a network port having a first port number;
   a second network interface module which receives data of the digital device transmitted by the digital device in response to a data request transmitted, by the second network interface module, to the digital device, and which is a network port having a second port number which is different than the first port number; and
   a control module which updates state information of the digital device based on the received changed state information data,
   wherein the data request is a control instruction and the received data is media content.

2. The apparatus of claim 1, further comprising a storage module which stores the state information.

3. The apparatus of claim 1, further comprising a graphic user interface providing module which provides a graphic user interface, comprising a state frame which displays the state information of the digital device and a control frame which provides control functions for the digital device.

4. The apparatus of claim 3, wherein if the changed state information is received from the digital device, the graphic user interface providing module updates the state information displayed in the state frame based on the changed state information.

5. The apparatus of claim 1, wherein the second network interface module receives user interface information from the digital device.

6. The apparatus of claim 5, wherein the user interface information comprises markup language.

7. The apparatus of claim 5, wherein the control instruction is input by a user through the user interface information.

8. The apparatus of claim 1, wherein the state information data comprises identification information of the digital device.

9. The apparatus of claim 1, wherein the home network is a web-based home network.

10. The apparatus of claim 1, wherein the second network interface module receives a device information file from the digital device, the device information file comprising location information of a file that describes a set of commands for operating the digital device.

11. A method of providing state information of a digital device in a home network, the method comprising:
  receiving, by a first network port having a first port number, changed state information from the digital device in the home network;
  receiving, by a second network port having a second port number which is different than the first port number, data of the digital device transmitted by the digital device in response to a data request transmitted, by the second network port, to the digital device; and
  updating state information of the digital device based on the received state information,
  wherein the data request is a control instruction and the received data is media content.

12. The method of claim 11, further comprising providing a graphic user interface which displays the state information of the digital device and provides control functions for the digital device.

13. The method of claim 12, further comprising updating the state information to correspond to the changed state information if the changed state information is received from the digital device, and displaying the state information after the updating.

14. The method of claim 11, further comprising receiving, by the second network port, user interface information from the digital device.

15. The method of claim 14, wherein the user interface information comprises markup language.

16. The method of claim 14, wherein the control instruction is input by a user through a user interface.

17. The method of claim 11, wherein the state information comprises identification information of the digital device.

18. The method of claim 11, wherein the home network is a web-based home network.

19. A non-transitory computer-readable medium storing a program for performing a method of providing state information of a digital device in a home network, the method comprising:
  receiving, by a first network port having a first port number, changed state information from the digital device in the home network;
  receiving, by a second network port having a second port number which is different than the first port number, data of the digital device transmitted by the digital device in response to a data request transmitted to the digital device; and updating state information of the digital device based on the received state information, wherein the data request is a control instruction and the received data is media content.

20. The apparatus of claim 1, wherein the first network interface module receives the changed state information without requesting the changed state information.

* * * * *